United States Patent
Nishio et al.

[11] Patent Number: 6,149,566
[45] Date of Patent: Nov. 21, 2000

[54] HEATING DEVICE FOR HEAT-SEALING BOTTOM PORTIONS OF CONTAINERS

[75] Inventors: Yoji Nishio; Masaru Matsuda; Michio Ueda, all of Tokushima, Japan

[73] Assignee: Shikoku Kakoki Co., LTD, Tokushima, Japan

[21] Appl. No.: 09/256,086

[22] Filed: Feb. 24, 1999

[30] Foreign Application Priority Data

Feb. 25, 1998 [JP] Japan .................................. 10-043439

[51] Int. Cl.⁷ ....................................................... B31B 1/64
[52] U.S. Cl. ........................ 493/134; 493/133; 493/164; 493/165
[58] Field of Search .................................... 493/189, 190, 493/191, 134, 133, 97, 205, 207, 208, 209, 274, 165, 164; 53/373.9, 370.9, 370.8; 261/31, 33

[56] References Cited

U.S. PATENT DOCUMENTS

| | | |
|---|---|---|
| 3,309,841 | 3/1967 | Egleston et al. |
| 3,724,093 | 4/1973 | Olila .................................... 493/134 |
| 3,789,746 | 2/1974 | Martensson et al. .................... 53/375 |
| 3,825,408 | 7/1974 | Farfaglia et al. ....................... 493/134 |
| 4,368,095 | 1/1983 | Gross et al. ............................ 493/134 |
| 5,230,204 | 7/1993 | Hall et al. .............................. 493/134 |
| 5,943,840 | 8/1999 | Nilsson et al. ......................... 53/133.2 |

FOREIGN PATENT DOCUMENTS

| | | |
|---|---|---|
| 0 832 731 A2 | 1/1998 | European Pat. Off. |
| 0 832 732 A2 | 1/1998 | European Pat. Off. |
| 9-226725 | 9/1997 | Japan . |
| 10-53204 | 2/1998 | Japan . |

*Primary Examiner*—Stephen F. Gerrity
*Assistant Examiner*—Sam Tawfik
*Attorney, Agent, or Firm*—Armstrong, Westerman, Hattori, McLeland & Naughton

[57] ABSTRACT

A heating device for heat-sealing bottom portions of containers has a hot air nozzle 62. The nozzle 62 is positionable as opposed to a bottom forming end portion 14 of a tubular blank 11 of square cross section as fitted around an intermittently drivable mandrel 52 for heating a region of the blank end portion. The nozzle 62 is movable toward or away from the end portion 14 on the axis of the blank 11. The nozzle 62 has orifices 101, 102, 131, 132, 133 directed toward a plurality of parts within the region when the nozzle is positioned close to the end portion. Among the orifices 101, 102, 131, 132, 133 of the nozzle 62, those 101, 131 directed toward the part of the region remote from an extremity of the blank when the nozzle is so positioned have a greater open area ratio than those 102, 133 directed toward the part of the region proximate to the blank extremity when the nozzle is so positioned.

6 Claims, 8 Drawing Sheets

HEATING DEVICE FOR HEAT-SEALING BOTTOM PORTIONS OF CONTAINERS

BACKGROUND OF THE INVENTION

The present invention relates to a heating device for heat-sealing the bottom portions of containers for use with tubular blanks of rectangular to square cross section in folding a bottom forming end portion of each blank flat and heat-sealing the folded end portion.

Devices of the type mentioned are already known which have a hot air nozzle positionable as opposed to a bottom forming end portion of a tubular blank of rectangular to square cross section as fitted around an intermittently drivable mandrel for heating a region of the blank end portion, the nozzle being movable toward or away from the end portion on the axis of the blank. The hot air nozzle has a plurality of orifices directed toward a plurality of parts uniformly distributed over the entire region to be heated of the end portion when the nozzle is moved toward the blank end portion.

With the above conventional device, the state of the blank heated with hot air is dependent on the time during which the nozzle is opposed to the blank end portion; the longer the time, the greater is the degree of heating. While being advanced into the blank end portion, the nozzle is first opposed to a part of the blank near the extremity thereof and then to other parts progressively inwardly of the blank. Accordingly the time during which the nozzle is opposed to the blank is relatively longer at the part close to the blank extremity and is relatively short at the inward part. This results in the tendency for the former part to be heated to excess and the latter part to be heated insufficiently, entailing difficulty in uniformly heating the entire region to be heated.

In the event of excessive heating, polyethylene over the surface of the container blank disappears owing a high temperature and develops pinholes. Especially in the case where the blank includes aluminum foil, the foil becomes markedly inflated and is susceptible to formation of pinholes.

Furthermore, the blank is likely to become heated insufficiently and will not be bonded with high strength at the four corners of interior of the end portion or at the lapped portion of the container material having twice the thickness of the material because the material, which is in the form of a sheet, is made into the blank of rectangular to square cross section. If it is attempted to heat the insufficiently heated portion to a full extent, the excessively heated portion becomes heated more excessively.

SUMMARY OF THE INVENTION

An object of the present invention is to overcome the above problems and to provide a heating device which is capable of uniformly heating the entire blank portion to be heated for use in heat-sealing the bottom portions of containers.

The present invention provides a heating device for heat-sealing bottom portions of containers comprising a hot air nozzle positionable as opposed to a bottom forming end portion of a tubular blank for heating a region of the blank end portion, at least one of the end portion and the hot air nozzle being movable toward or away from the other, the hot air nozzle having a plurality of orifices, the orifices of the hot air nozzle being directed toward a plurality of parts within the region when the nozzle is positioned close to the end portion, the heating device being characterized in that among the nozzle orifices, those directed toward the part of the region remote from an extremity of the blank when the nozzle is so positioned have a greater open area ratio than those directed toward the part of the region proximity to the blank extremity when the nozzle is so positioned.

Among the orifices of the hot air nozzle of the heating device embodying the invention, those directed toward the part of the region remote from an extremity of the blank when the nozzle is so positioned have a greater open area ratio than those directed toward the part of the region proximity to the blank extremity when the nozzle is so positioned. Accordingly, a relatively large quantity of hot air can be applied to the inward part of the blank where the nozzle is opposed to the blank for a relatively short period of time, whereby the blank portion to be heated can be heated uniformly in its entirety.

The hot air nozzle has a nozzle member for heating an inner surface of the blank, the nozzle member having four side walls forming a quadrilateral contour in cross section and opposed to an inner surface of the bottom forming end portion when the nozzle is positioned close to the end portion, the orifices including those aligned on each of four ridgelines formed by the adjacent side walls of the nozzle member for heating each of four corners of the bottom forming portions, the corner heating orifices on each ridgeline including one directed toward the part of the region remotest from the blank extremity when the nozzle is so positioned and toward the corresponding ridgeline obliquely downwardly thereof. The innermost four corners of interior of the bottom forming end portion can then be heated effectively.

The bottom forming end portion comprises four first to fourth bottom panels approximately quadrilateral and integral with one another, and a fifth bottom panel integral with a free edge of the fourth bottom panel and affixed to an inner surface of the first bottom panel, and among the orifices of the inner surface heating nozzle member, those for heating the fifth bottom panel and/or a striplike portion of the first bottom panel therealong have a greater open area ratio than those for heating the other parts. The nozzle is then capable of effectively heating the fifth bottom panel and/or the first bottom panel striplike portion therealong.

The hot air nozzle has a nozzle member for heating an outer surface of the blank, the outer surface heating nozzle member having four side walls forming a quadrilateral contour in cross section and opposed to an outer surface of the bottom forming end portion when the nozzle is positioned close to the end portion, the outer surface heating nozzle member having orifices for heating the first bottom panel striplike portion along the fifth bottom panel. The striplike portion of the first bottom panel can then be heated also from outside the blank.

DESCRIPTION OF THE PREFERRED EMBODIMENT

An embodiment of the invention will be described below with reference to the drawings.

Figure 6:
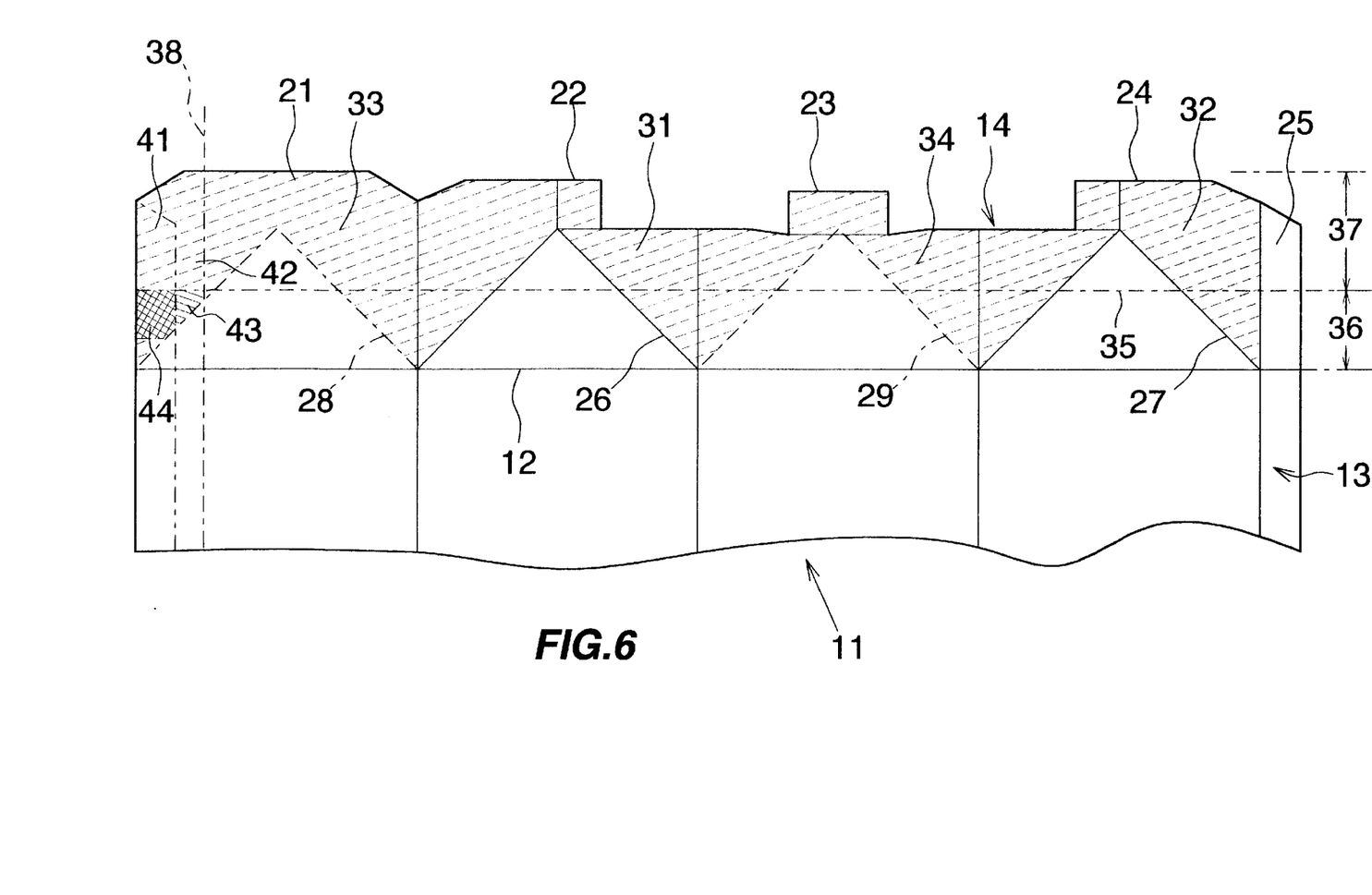
FIG. 6 is a development of the inner side of a blank.
Figure 7:
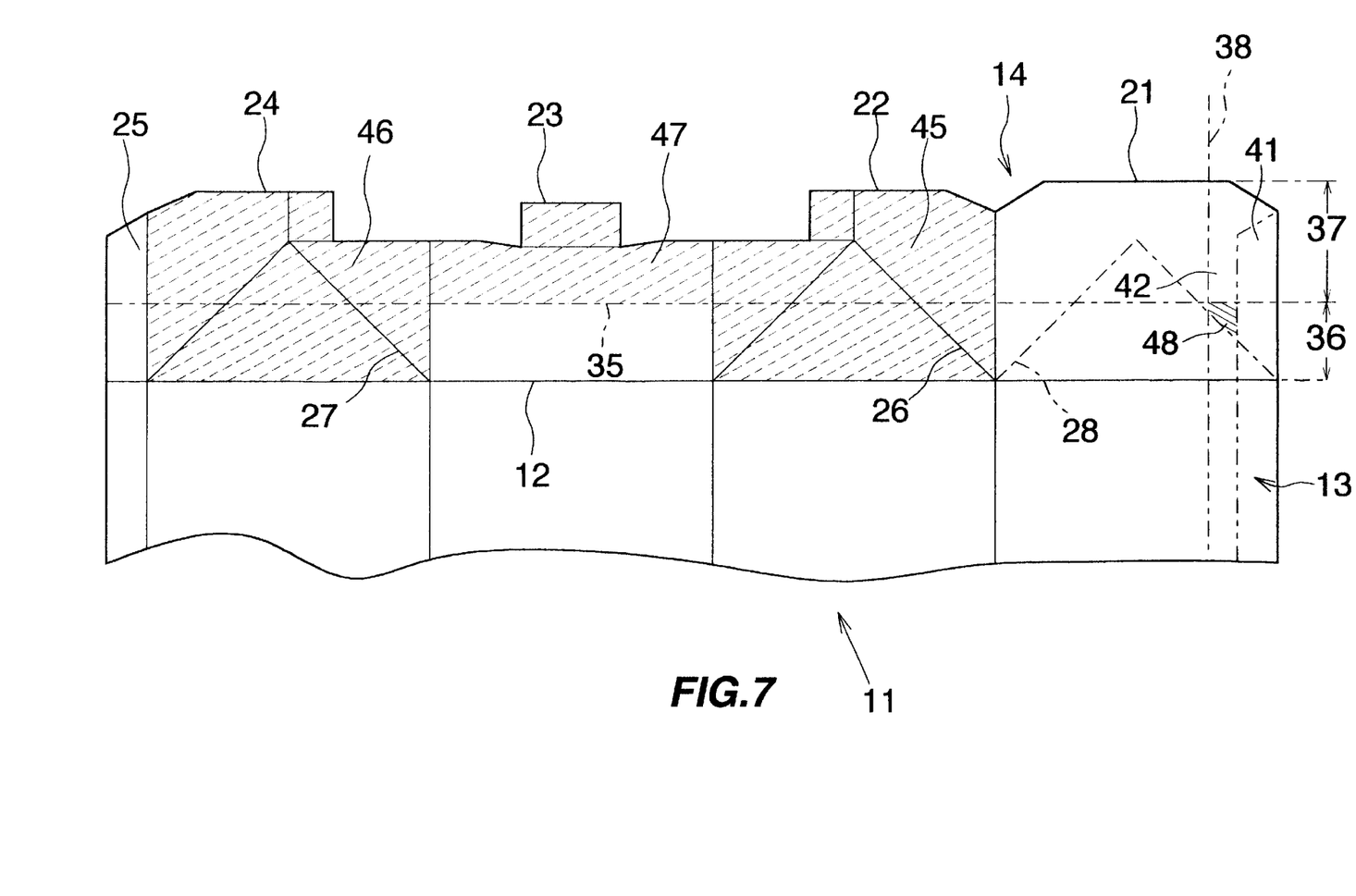
FIG. 7 is a development of the outer side of the blank.

FIG. 6 is a development showing a blank as it is seen from inside, and FIG. 7 is a development showing the blank as it is seen from outside.

The blank 11 has a trunk forming portion 13 and a bottom forming portion 14 which are divided by a horizontal score 12.

With reference to FIG. 6, the bottom forming portion 14 has four generally rectangular panels, i.e., first to fourth bottom panels 21 to 24, which are integral with one another as arranged from the left rightward, and a striplike fifth bottom panel 25 integral with the right edge of the fourth bottom panel 24.

The second bottom panel 22 and the fourth bottom panel 24 are formed with fold-forming Inverted V-shaped scores 26, 27, respectively. On the other hand, inverted V-shaped phantom lines 28, 29 identical with the inverted V-shaped scores 26, 27 in shape are shown respectively on the first bottom panel 21 and the third bottom panel 23. The portions 31, 32 of the second bottom panel 22 and the fourth bottom panel 24 upward from their scores 26, 27, and the portions 33, 34 of the first bottom panel 21 and the third bottom panel 23 upward from their phantom lines 28, 29 are the regions to be heated as indicated by hatching with chain lines.

A horizontal phantom line 35 is shown in the first to fifth bottom panels 21 to 25 at an intermediate portion of their height. Of the regions 31 to 34 to be heated, the portions downward from the horizontal phantom line 35 are included in an area 36 which is difficult to heat, and the portions upward from the phantom line 35 in an area 37 which is easy to heat.

The blank 11 is shaped in the form of a tube of square cross section (see FIG. 8) in advance. For shaping, the outer surface of the fifth bottom panel 25 is joined to the left edge of inner surface of the first bottom panel 21 by heat sealing. For heat sealing, a striplike left edge portion of inner surface of the first bottom panel 21 is heated. The striplike portion to be heated is at the left side of a vertical phantom line 38 and has a width approximately twice the width of the fifth bottom panel 25. When heat-sealed, the left half of the striplike portion is lapped over and joined to the fifth bottom panel 25, forming a seal portion 41, while the right half thereof is left exposed as a nonseal portion 42. A polyethylene layer over the surface of the nonseal portion 42 is melted by heating for heat sealing but is thereafter cooled, whereby the molten polyethylene forms a polyethylene layer again. The resulting polyethylene layer is lower in seal strength than the layer before melting, so that the reformed polyethylene layer needs to be heated sufficiently for further heat sealing. Special consideration must be given to the inward part of the nonseal portion 42 included in the area 36 difficult to heat and indicated by hatching with solid lines. This part will be referred to as a "first part 43 to be heated intensely." Further at the border between the seal portion 41 and the nonseal portion 42, there is a stepped part corresponding to the thickness of the fifth bottom panel 25, with the result that a liquid is liable to leak from the stepped part. This can be prevented by positively heating the inner surface of the fifth bottom panel 25 adjacent to the first part 43 to be heated intensely as indicated by crosshatching to melt the polyethylene layer exiting there, allowing the molten polyethylene to flow to the stepped part. The part adjacent to the first part 43 will be referred to as a "second part 44 to be heated intensely."

On the other hand, the outer side of the blank 11 includes the portions to be heated which are indicated by hatching in FIG. 7, i.e., the entire portions 45, 46 of the second bottom panel 22 and the fourth bottom panel 24, and the portion 47 of the third bottom panel 23 which is included in the area 37 easy to heat. The first bottom panel 21 has a third part 48 to be heated intensely, i.e., to be heated especially, which is exactly opposite to the first part 43 to be heated on the blank inner side. Since the first part 43 can not be heated sufficiently when heated only from inside the blank, this part can then be heated more effectively when heated from outside the blank.

Figure 1:
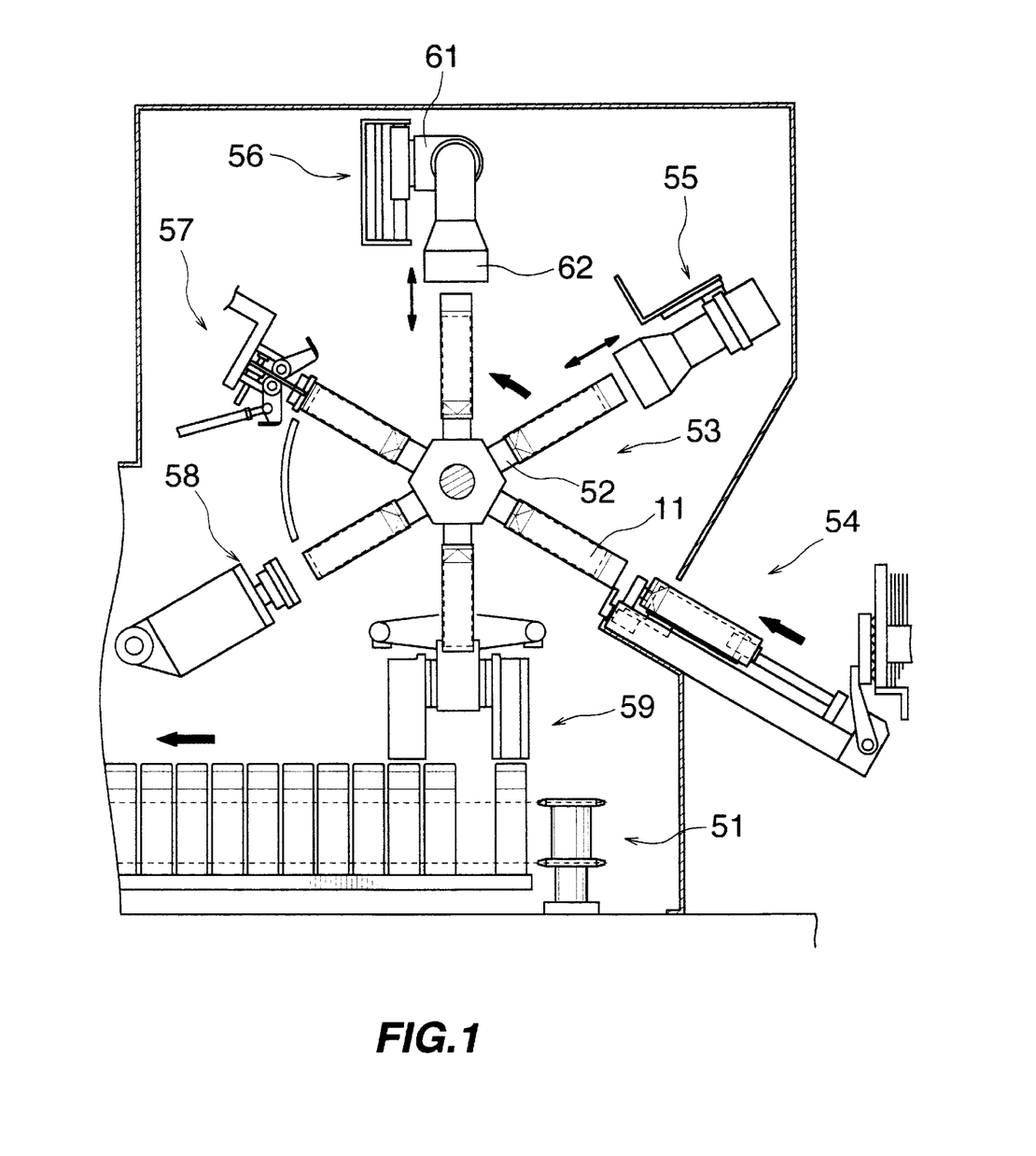
FIG. 1 is a side elevation of a packaging machine including a heating device embodying the invention for heat-sealing the bottoms of containers.

FIG. 1 shows a rotor 53 intermittently drivable counterclockwise, having six radial mandrels 52 and disposed above the path of transport of a container conveyor 51, and a blank feeder 54, primary heater 55, secondary heater 56, breaker 57, press 58 and transfer device 59 which are arranged successively at six stations where the mandrels are stopped.

The tubular blank 11 of square cross section is fitted to the mandrel 52 by the feeder 54, with the bottom forming portion 14 of the blank projecting from the mandrel 52. The blank 11 fitted around the mandrel 52 has its fourth bottom panel 24 directed downstream with respect to the direction of rotation of the rotor. The areas of the bottom forming portion 14 to be heated are successively heated by the primary heater 55 and the secondary heater 56. When sent to the breaker 57, the blank 11 is folded by the breaker 57 in the following manner.

Figure 8:
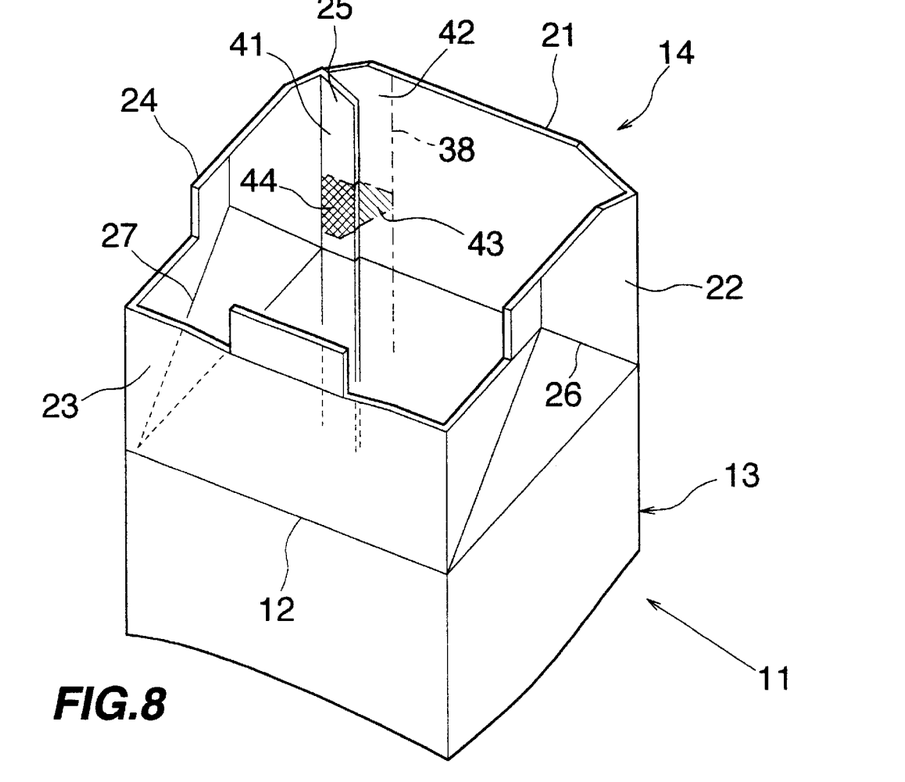
FIG. 8 is a perspective view of the blank as shaped in the form of a tube of square cross section.
Figure 9:
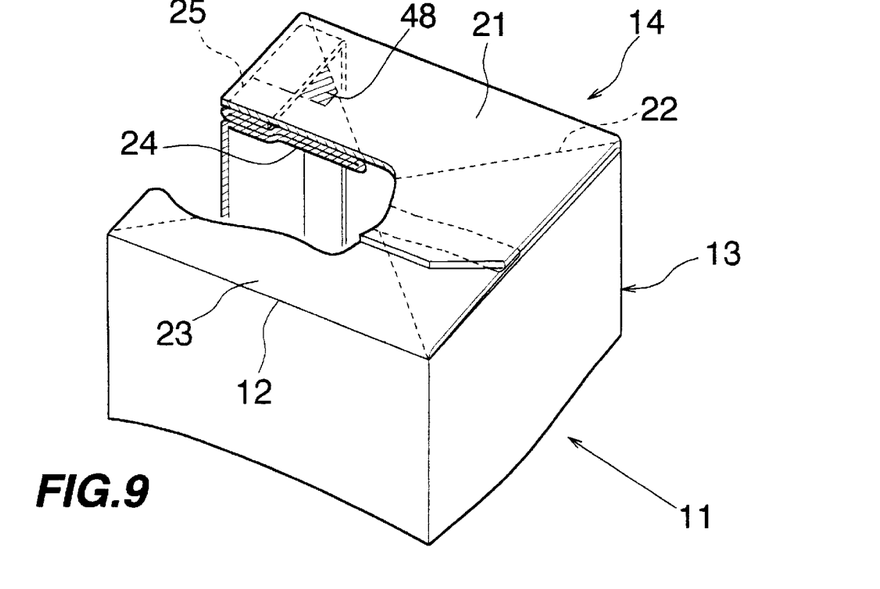
FIG. 9 is a perspective view partly broken away and showing the blank as closed at its bottom.

With reference to FIG. 8, the blank 11 shaped in the form of a tube of square cross section has its second bottom panel 22 and fourth bottom panel 24 folded inward first, with the two triangular portions upward from each score 26 (27) of each of the second bottom panel 22 and the fourth bottom panel 24 lapped over the triangular portion downward from the score 26 (27). The first bottom panel 21 and the third bottom panel 23 are then folded inward and lapped over the folded second and fourth bottom panels 22, 24, with the first bottom panel 21 positioned over the third bottom panel 23.

The blank 11 having its bottom forming portion 14 folded entirely is sent to the press 58, and the bottom forming portion 14 is eventually pressed from inside and outside and thereby shaped flat. In the bottom forming portion 14 shaped flat, the fourth bottom panel 24 has a triangular part which is folded in two, has twice the thickness of the blank and extends under the first to third parts 43, 44, 48 to be heated intensely which extend at opposite sides of the stepped part of the fifth bottom panel 25.

The primary heater 55 and the secondary heater 56 are of the same construction. The primary heater 55 only will be described below.

The primary heater 55 comprises a heater body 61 supported movably on the axis 52 of the mandrel as halted at the corresponding station, and a hot air nozzle 62 attached to the heater body 61 and opposed to the end face of the mandrel 52 so as to be movable toward or away from the end face.

Figure 2:
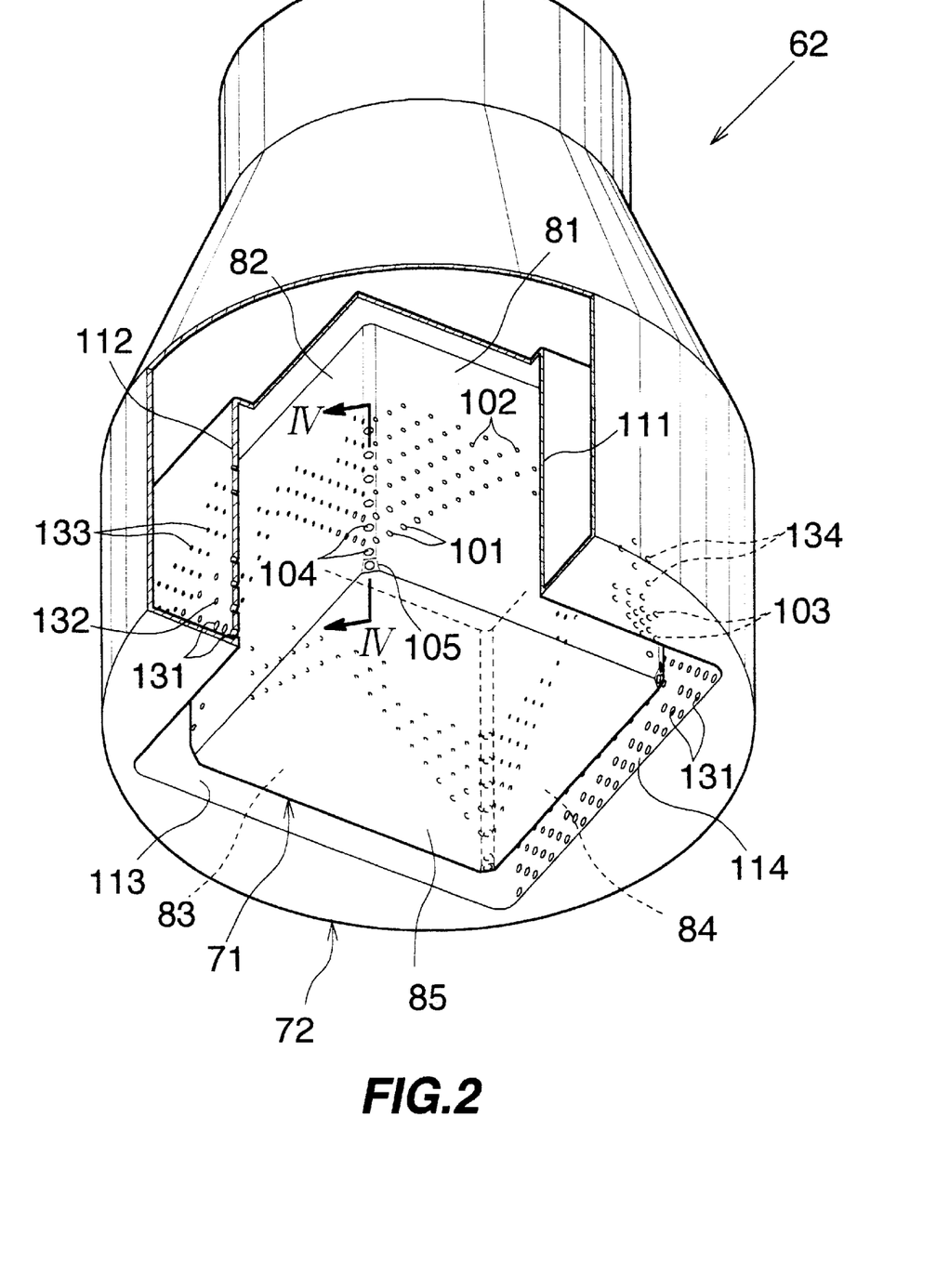
FIG. 2 is a perspective view partly broken away and showing a hot air nozzle of the heating device.

As shown in detail in FIG. 2, the hot air nozzle 62 comprises a nozzle member 71 in the form of a bottomed tube of square cross section for heating the inner surface of the blank, and a hollow annular nozzle member 72 surrounding the nozzle member 71 at a predetermined spacing therefrom for heating the outer surface of the blank.

The inner surface heating nozzle member 71 has first to fourth four side walls 81 to 84 and a bottom wall 85. When the hot air nozzle 62 is brought close to the end face of the mandrel 52, these side walls 81 to 84 are opposed respectively to the four bottom panels 21 to 24 of the bottom forming portion 14 of the blank 11 as fitted around the mandrel 52. (The fifth bottom panel 25 is lapped over the first bottom panel 21.)

The first to fourth side walls 81 to 84 are formed with orifices, which will be described in detail.

Figure 3:
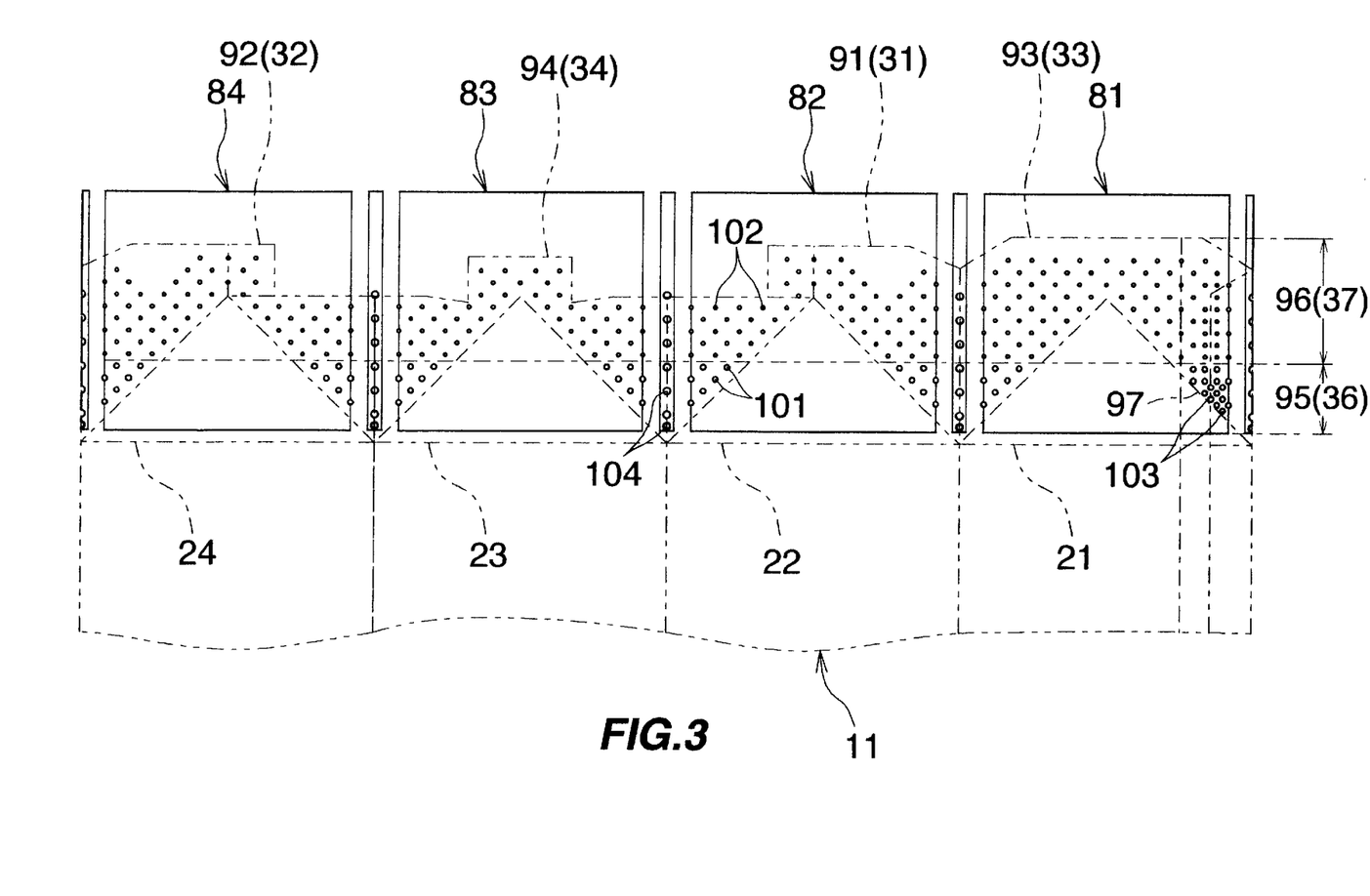
FIG. 3 is a side elevation in development of a blank inner surface heating nozzle member of the hot air nozzle.

FIG. 3 is a development of the first to fourth side walls 81 to 84 as viewed from outside (where the outer surface heating nozzle member 72 is located). The first to fourth side walls 81 to 84 correspond respectively to the first to fourth bottom panels 21 to 24 of the bottom forming portion 14. With reference to FIG. 3, the first to fourth side walls 81 to 84 are arranged one after another from the right leftward. For a better understanding, the blank 11 as seen from inside in develop and indicated in phantom lines is superposed on the inner surface heating nozzle member 71 in FIG. 3.

The first to fourth side walls 81 to 84 have regions 91 to 94 which are formed with orifices and which are in match with the regions 31 to 34 to be heated of the blank inner surface. The nozzle member 71 also has an intense heating area 95 and a weak heating area 96 corresponding respectively to the area 36 of the blank inner surface difficult to heat and the area 37 thereof easy to heat. The nozzle member 71 further has a special heating area 97 corresponding to the first part 43 and the second part 44 to be heated intensely of the blank first side panel 21. The intense heating area 95 is formed with first orifices 101, the weak heating area 96 with second orifices 102, and the special heating area 97 with third orifices 103, the first to third orifices being formed in a staggered arrangement. The first orifices 101 and the second orifices 102 are arranged with the same pitch, but the first orifices 101 are greater than the second orifices 102 in diameter, whereby the first orifices 101 of the intense heating area 95 are given a greater open area ratio than the second orifices 102 of the weak heating area 96. The first orifices 101 have the same diameter as the third orifices 103, but the third orifices 103 are arranged with a smaller pitch than the first orifices 101, whereby the third orifices 103 of the special heating area 97 are given a greater open area ratio than the first orifices 101 of the intense heating area 95.

Each of ridgelines formed by the adjacent first to fourth side walls 81 to 84 is formed with fourth orifices 104 which are aligned.

Figure 4:
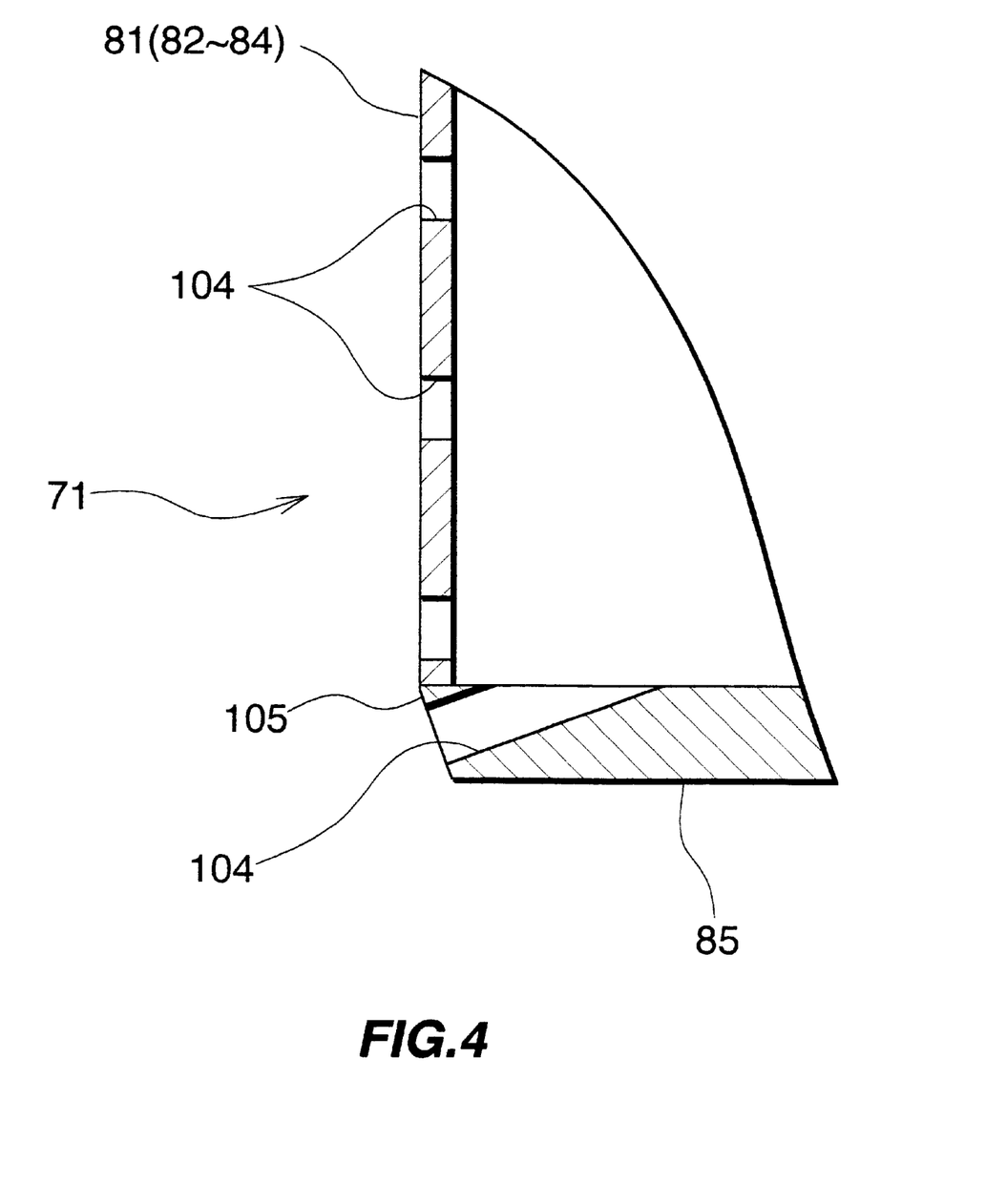
FIG. 4 is a view in section taken along the line IV—IV in FIG. 2.

FIG. 4 shows the bottom wall 85 of the blank inner surface heating nozzle member 71. The bottom wall 85 has a greater thickness than the side walls 81 to 84. Each corner of the bottom wall 85 is chamfered obliquely downward as at 105, and the lowermost fourth orifice 104 is formed in the chamfered portion 105 obliquely downwardly of the ridgeline. The fourth orifices 104 other than the lowermost orifice 104 are orthogonal to the ridgeline.

The nozzle member 72 for heating the blank outer surface has four first to fourth inner side walls 111 to 114 corresponding respectively to the first to fourth side walls 81 to 84 of the nozzle member 71 for heating the blank inner surface.

Figure 5:
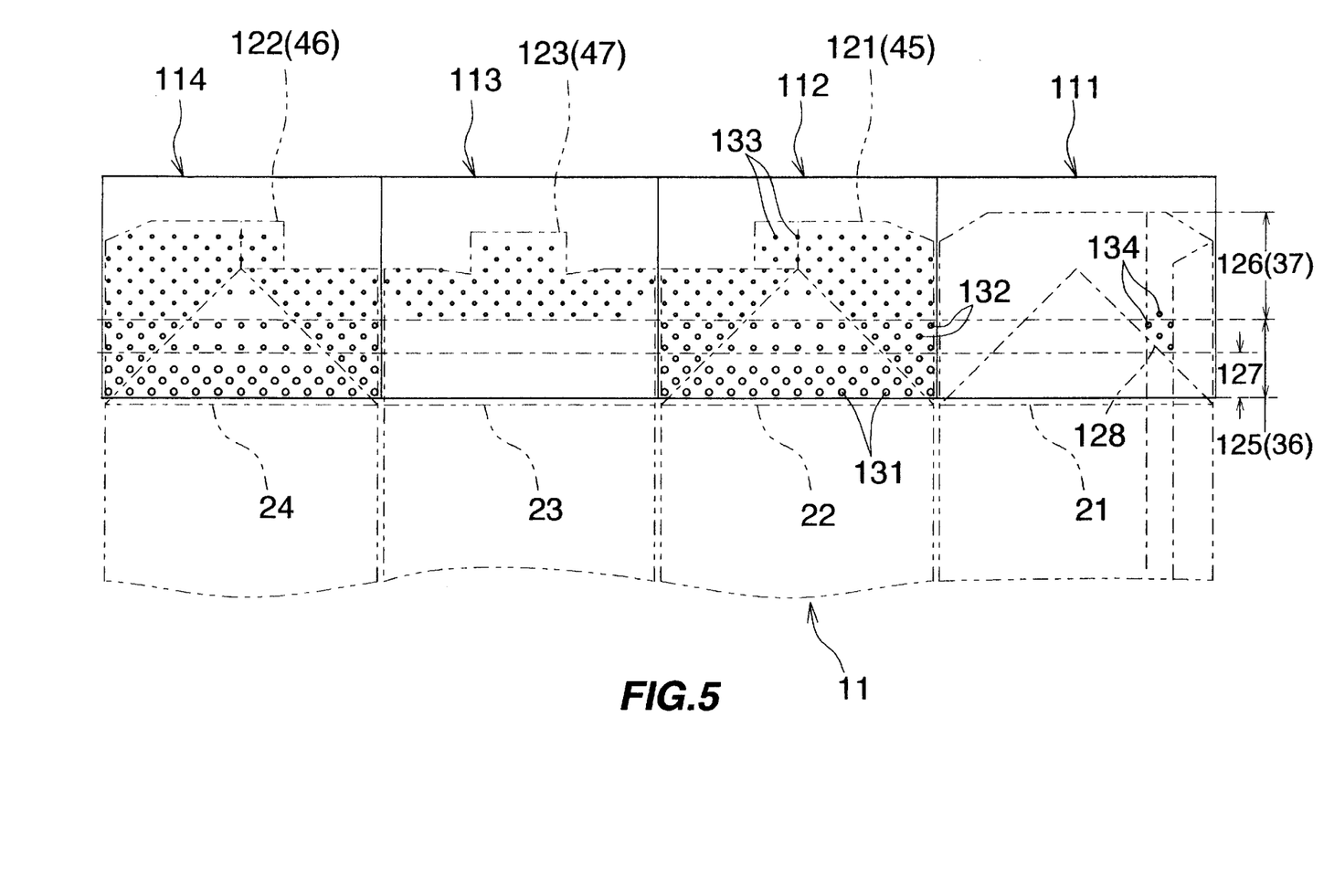
FIG. 5 is a side elevation in development of a blank outer surface heating nozzle member of the hot air nozzle.

FIG. 5 is a development showing the first to fourth inner side walls 111 to 114 as viewed from outside (from inside the hollow interior of the nozzle member 72). The first to fourth inner side walls 111 to 114 corresponding respectively to the first to fourth bottom panels 21 to 24 of the bottom forming portion 14 are arranged in succession from the right leftward. As is the case with the nozzle member 71, the blank 11 as seen from outside in develop and indicated in phantom lines is superposed on the nozzle member 72 in FIG. 5.

The second to fourth inner side walls 112 to 114 have regions 121 to 123 formed with orifices and in match with the regions 45 to 47 to be heated of the blank outer surface. The nozzle member 72 also has an intense heating area 125 and a weak heating area 126 corresponding respetively to the area 36 of the blank outer surface difficult to heat and the area 37 thereof easy to heat. The nozzle member 72 further has a special intense heating area 127 approximately over the lower half of the intense heating area 125, and a special heating area 128 corresponding to the third part 48 to be heated intensely of the outer surface of the blank first side wall 21. Formed in a staggered arrangement are first orifices 131 in the special intense heating area 127, second orifices 132 in the intense heating area 125 other than the special intense heating area 127, third orifices 133 in the weak heating area 126, and fourth orifices 134 in the special heating area 128. The first to third orifices 131 to 133 are arranged with the same pitch, but the first orifices 131, second orifices 132 and third orifices 133 are in the order of decreasing diameters. As a result, the special intense heating area 127, intense heating area 125 other than the area 127 and weak heating area 126 are in the order of increasing orifice open area ratios. The fourth orifices 134 are the same as the second orifices 132 in pitch and diameter.

When heating the inner surface of the bottom forming portion 14 of the blank 11, the inner surface heating nozzle member 71 is moved into and out of the bottom forming portion 14. During this movement, hot air is continuously forced out from the orifices 101 to 104 of the nozzle member 71. The first orifices 101 discharge the hot air in a larger amount than the second orifices 102. During the movement of the nozzle member 71, the inner surface portion to be heated is exposed to the hot air for a longer period of time when closer to the extremity of the bottom forming portion 14, and is exposed to the hot air for a shorter period of time if remoter from the extremity. Generally, a small amount of hot air is applied from the second orifices 102 to the inner surface portion in the former case, while a large amount of hot air is applied from the first orifices 101 in the latter case. Consequently, the bottom forming portion 14 is almost uniformly heated over the entire inner surface.

Further with the movement of the nozzle 71, the third orifices 103 heat the striplike portion of inner surface of the first bottom panel 21 corresponding to the first part 43 to be heated intensely and positioned along the fifth bottom panel 25 and the inner surface of the fifth bottom panel 25 corresponding to the second part 44 to be heated intensely. The fourth orifices 104 further heat the four corners of inner surface of the bottom forming portion 14. When the nozzle member 71 is advanced into the bottom forming portion 14 to the innermost position, the lowermost fourth orifices 104 heat further inward parts of the four corners which are not accessible by the nozzle member 71.

On the other hand, the nozzle member 72 for heating the blank outer surface discharges hot air in large, medium and small amounts corresponding to the first to third orifices 131 to 133. As is the case with the inner surface of the bottom forming portion 14, the outer surface of this portion 14 is entirely heated uniformly with these different amounts of hot air. The fourth orifices 134 further heat the striplike portion of outer surface of the first bottom panel 21 corresponding to the third part 48 to be heated intensely and positioned along the fifth bottom panel 25.

Although the primary heater 55 and the secondary heater 56 are of the same construction as described above, the primary and secondary heaters 55, 56 to be used may be different in the arrangement pattern of orifices.

The hot air nozzle is made movable for the blank according to the above embodiment, whereas conversely the mandrel carrying the blank as fitted therearound may be made movable axially thereof toward or away from a fixed hot air nozzle.

Furthermore, the open area ratio is not limited to those described for the foregoing embodiment but is suitably adjustable by altering the diameter of orifices and the pitch of orifices arranged. However, the open area ratios of the embodiment are found favorable by trial and error.

What is claimed is:

1. A heat device for heat-sealing bottom portions of containers comprising a hot air nozzle positionable as opposed to a bottom forming end portion of a tubular blank for heating a region of the blank end portion, at least one of the end portion and the hot air nozzle being movable toward and away from the other, the hot air nozzle having a plurality of orifices, the orifices of the hot air nozzle being directed toward a plurality of parts within the region when the nozzle is positioned close to the end portions, the heating device being characterized in that the nozzle orifices comprises first orifices directed toward a first part of the region remote from an extremity of the blank when the blank is so positioned and second orifices directed toward a second part of the region proximate to the blank extremity when the blank is so positioned, said first orifices being of greater diameter than said second orifices, a first open area ratio being a ratio of total area of the first orifices to an entire area of the first part, a second open area ratio being a ratio of total area of the second orifices to an entire area of the second part, said first open area ratio being greater than said second open area ratio.

2. A heating device according to claim 1 wherein the hot air nozzle has a nozzle member for heating an inner surface of the blank, the nozzle member having four side walls forming a quadrilateral contour in cross section and opposed to an inner surface of the bottom forming end portion when the nozzle is positioned close to the end portion, the orifices including those aligned on each of four ridgelines formed by adjacent side walls of the nozzle member for heating each of four corners of the bottom forming portions, the corner heating orifices on each ridgeline including one directed toward the part of the region remotest from the blank extremity when the nozzle is so positioned and toward the corresponding ridgeline obliquely downwardly thereof.

3. A heating device according to claim 2 wherein the bottom forming end portion comprises four first to fourth bottom panels approximately quadrilateral and integral with one another, and a fifth bottom panel integral with a free edge of the fourth bottom panel and affixed to an inner surface of the first bottom panel, and among the orifices of the inner surface heating nozzle member, those for heating the fifth bottom panel and optionally a striplike portion of the first bottom panel therealong have a greater open area ratio than those for heating the other parts.

4. A heating device according to claim 3 wherein the hot air nozzle has a nozzle member for heating an outer surface of the blank, the outer surface heating nozzle member having four side walls forming a quadrilateral contour in cross section and opposed to an outer surface of the bottom forming end portion when the nozzle is positioned close to the end portion, the outer surface heating nozzle member having orifices for heating the first bottom panel striplike portion along the fifth bottom panel.

5. A heat device for heat-sealing bottom portions of containers as defined in any one of claims 1 to 4 wherein an amount of hot air directed to the bottom portions of containers is adjusted by altering a diameter of each orifice.

6. A heat device for heat-sealing bottom portions of containers as defined in any one of claims 1 to 4 wherein an amount of hot air directed to the bottom portions of containers is adjusted by altering the number of orifices in unit area.

* * * * *